(12) United States Patent
Tsuchihashi et al.

(10) Patent No.: US 11,418,138 B2
(45) Date of Patent: Aug. 16, 2022

(54) DRIVING CIRCUIT AND DRIVING METHOD OF STEPPING MOTOR AND ELECTRONIC MACHINE USING THE SAME

(71) Applicant: ROHM CO., LTD., Kyoto (JP)

(72) Inventors: Masanori Tsuchihashi, Kyoto (JP); Hiroki Hashimoto, Kyoto (JP); Mitsuo Okada, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 16 days.

(21) Appl. No.: 16/798,812

(22) Filed: Feb. 24, 2020

(65) Prior Publication Data
US 2020/0280272 A1 Sep. 3, 2020

(30) Foreign Application Priority Data

Feb. 28, 2019 (JP) .............................. JP2019-036568

(51) Int. Cl.
*H02P 8/22* (2006.01)
*H02P 8/18* (2006.01)

(52) U.S. Cl.
CPC . *H02P 8/22* (2013.01); *H02P 8/18* (2013.01)

(58) Field of Classification Search
None
See application file for complete search history.

(56) References Cited

U.S. PATENT DOCUMENTS

| 7,391,174 | B2 * | 6/2008 | Son | .................... | H02P 6/17 |
| | | | | | 318/400.01 |
| 7,609,015 | B2 | 10/2009 | Okui | | |
| 8,598,824 | B2 | 12/2013 | Ito et al. | | |
| 8,659,259 | B2 | 2/2014 | Suda | | |
| 2009/0206788 | A1 | 8/2009 | Ando | | |
| 2014/0156144 | A1 * | 6/2014 | Hoshi | ................. | H02P 29/0241 |
| | | | | | 318/400.15 |

(Continued)

FOREIGN PATENT DOCUMENTS

| JP | H09103096 A | 4/1997 |
| JP | 2000184798 A | 6/2000 |

(Continued)

OTHER PUBLICATIONS

USPTO Ex Parte Quayle Action for corresponding U.S. Appl. No. 16/815,645 Dated, Jun. 28, 2021.

(Continued)

*Primary Examiner* — Said Bouziane
(74) *Attorney, Agent, or Firm* — Cantor Colburn LLP (57) ABSTRACT

The task of the present invention is to provide a driving circuit capable of outputting information useful to design or control of a system to outside. The present invention relates to a driving circuit and a driving method of a stepping motor, and an electronic machine using the driving circuit of a stepping motor. A counter electromotive force detection circuit detects a counter EMF generated in a coil. A revolution count detection circuit acquires the revolution count of the stepping motor. A load angle estimating portion calculates a load angle according to the counter EMF and the revolution count. An interface circuit is configured to be capable of outputting angle information associated with the load angle to outside, or accessing the angle information from the outside.

13 Claims, 10 Drawing Sheets

(56) References Cited

U.S. PATENT DOCUMENTS

| | | | |
|---|---|---|---|
| 2015/0123591 A1* | 5/2015 | Inoue | H02P 8/12 |
| | | | 318/696 |
| 2015/0214878 A1 | 7/2015 | Takada et al. | |
| 2016/0231139 A1* | 8/2016 | Mizutani | G01R 15/202 |
| 2020/0083827 A1 | 3/2020 | Yamazaki et al. | |
| 2020/0287492 A1 | 9/2020 | Sega | |

FOREIGN PATENT DOCUMENTS

| | | |
|---|---|---|
| JP | 2004120957 A | 4/2004 |
| JP | 2004180354 A | 6/2004 |
| JP | 6258004 B2 | 1/2018 |

OTHER PUBLICATIONS

USPTO Non-Final Office Action for corresponding U.S. Appl. No. 16/798,641 dated Jun. 1, 2021.
USPTO Notice of Allowance for corresponding U.S. Appl. No. 16/815,645 dated Oct. 6, 2021.

* cited by examiner

DRIVING CIRCUIT AND DRIVING METHOD OF STEPPING MOTOR AND ELECTRONIC MACHINE USING THE SAME

CROSS REFERENCE TO RELATED APPLICATIONS

The present invention claims priority under 35 U.S.C. § 119 to Japanese Application No. 2019-036568 filed Feb. 28, 2019, the entire content of which is incorporated herein by reference.

BACKGROUND OF THE INVENTION

Field of the Invention

The present invention relates to a driving technology for a stepping motor.

Description of the Prior Art

Stepping motors are extensively applied in electronic machines, industrial machinery, and robots. Stepping motors are synchronous motors that rotate synchronously with an input clock generated by a host controller, and have excellent control properties in starting, stopping and positioning. Thus, stepping motors feature capabilities for positioning control in an open loop and suitability for digital signal processing.

In a normal state, a rotor of a stepping motor rotates synchronously in a unit of a step angle directly proportional to the number of input clocks. However, if a drastic change in the load or speed occurs, said synchronization is lost and such is referred to as "out-of-step". Once out-of-step happens, special processing needs to be performed in order to subsequently drive the stepping motor normally. Thus, avoiding out-of-step is desired.

Hence, during acceleration and deceleration having higher probabilities of out-of-step, a target value of a driving current is set to a constant value, so as to obtain an output torque large enough yet without causing out-of-step with respect to speed change.

Figure 1:
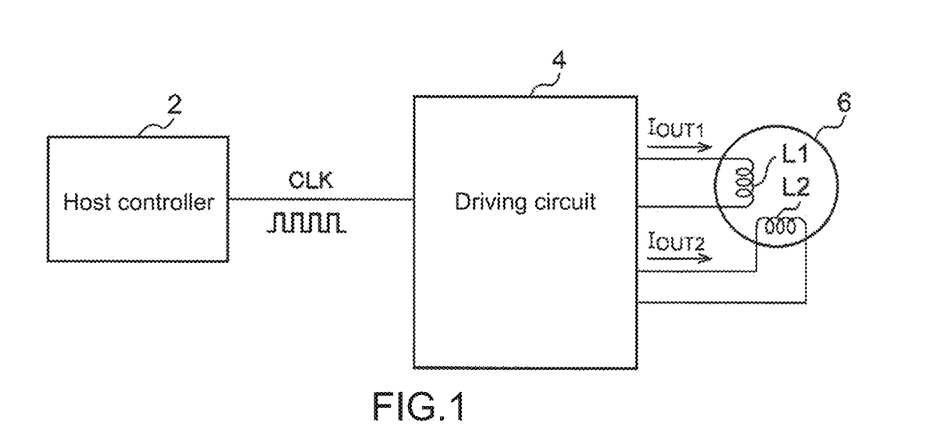
FIG. 1 is a block diagram of a conventional stepping motor and a motor system of a driving circuit thereof.

Patent document 5 proposes a technique as follows—power consumption is reduced to improve efficiency by avoiding out-of-step and optimizing an output torque (i.e., a current amount) by means of feedback. FIG. 1 shows a block diagram of a conventional stepping motor and a motor system of a driving circuit thereof.

A host controller 2 supplies an input clock CLK to a driving circuit 4. The driving circuit 4 changes the excitation position in synchronization with the input clock CLK.

Figure 2:
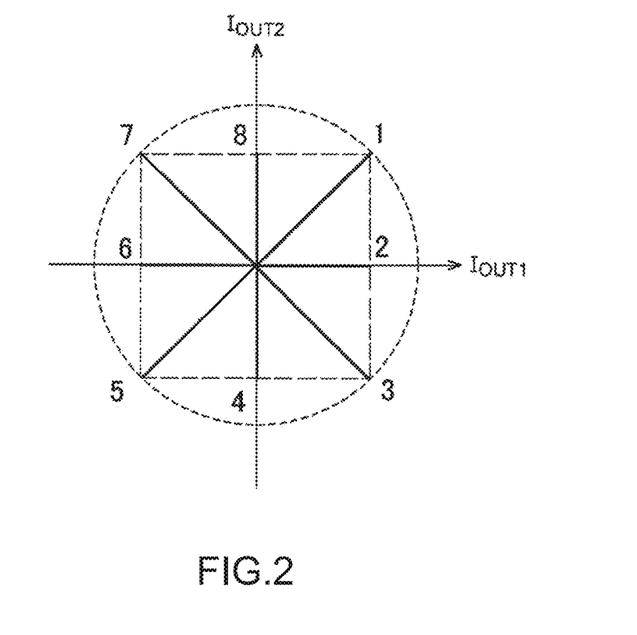
FIG. 2 is a diagram illustrating excitation positions.

FIG. 2 shows a diagram illustrating excitation positions. The excitation position can be understood as a combination of coil currents (driving currents) $I_{OUT1}$ and $I_{OUT2}$ flowing through two coils L1 and L2 of a stepping motor 6. In FIG. 2, eight excitation positions 1 to 8 are depicted. In 1-phase excitation, current alternately flows in the first coil L1 and the second coil L2, thus changing the excitation position among 2, 4, 6 and 8. In 2-phase excitation, current flows in the first coil L1 and the second coil L2, thus changing the excitation position among 1, 3, 5 and 7. 1-2-phase excitation is a combination of 1-phase excitation and 2-phase excitation, and causes the excitation position to change among 1 and 8. In micro-step driving, the excitation position is even more finely controlled.

Figure 3:
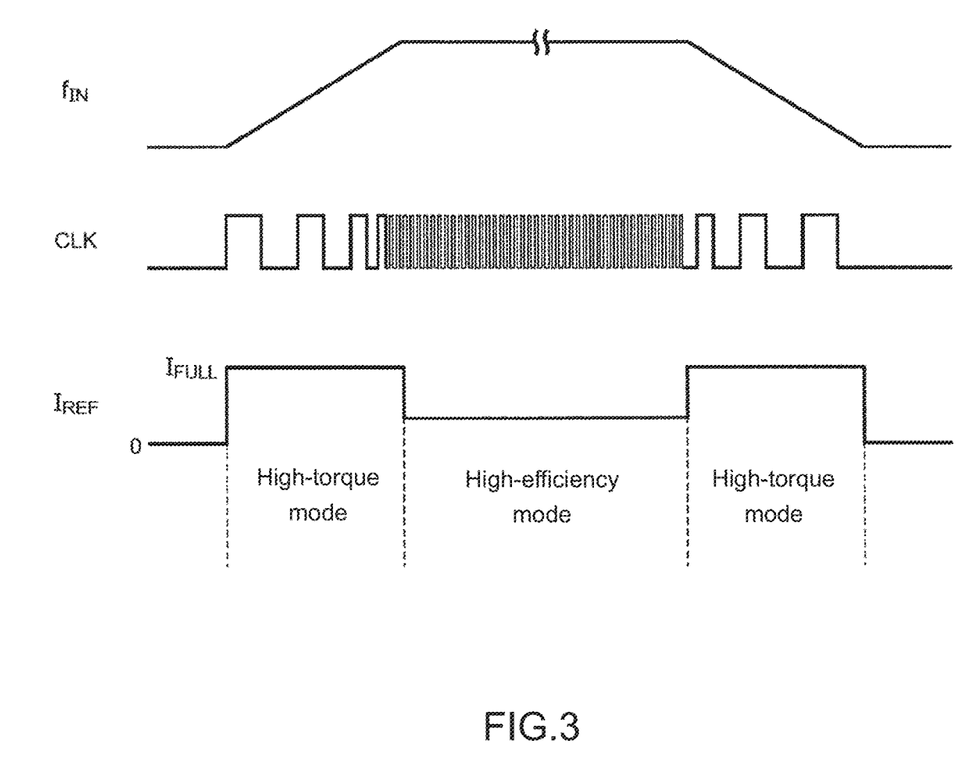
FIG. 3 is a diagram illustrating a driving sequence of a stepping motor.

FIG. 3 shows a diagram of a driving sequence of a stepping motor. At startup, the frequency $f_{IN}$ of the input clock CLK rises along with time, and the stepping motor accordingly accelerates. The frequency $f_{IN}$ is kept constant upon reaching a predetermined target value, and accordingly the stepping motor rotates at a constant speed. To later stop the stepping motor, the frequency of the input clock CLK is reduced to accordingly decelerate the stepping motor. The control in FIG. 3 is also referred to as trapezoidal wave drive.

In a normal state, a rotor of a stepping motor rotates synchronously in a unit of a step angle directly proportional to the number of input clocks. However, if a sudden change in the load or speed occurs, synchronization is lost and such is referred to as "out-of-step". Once out-of-step happens, special processing needs to be performed in order to subsequently drive the stepping motor normally. Thus, avoiding out-of-step is desired.

Hence, during acceleration and deceleration having higher probabilities of out-of-step, a target value $I_{REF}$ of a driving current is set to a constant value $I_{FULL}$ (high-torque mode), so as to obtain a fixed output torque large enough, with the margin for out-of-step having been taken into consideration.

In a situation where the revolution count is stable and the probability of out-of-step is lower, efficiency (high-efficiency mode) is improved by reducing the target value $I_{REF}$ of the driving current. Patent document 5 proposes a technique as follows—power consumption is reduced to improve efficiency by avoiding out-of-step and optimizing an output torque (i.e., a current amount) by means of feedback. More specifically, a load angle $\phi$ is estimated according to a counter electromotive force (EMF) $V_{BEMF}$, and the target value $I_{REF}$ of the driving current (coil current) is controlled by way having the load angle $\phi$ approach close to the target value $\phi_{REF}$. The counter EMF $V_{BEMF}$ is represented by equation (1):

$$V_{BEFM} = K_E \times \omega \times \cos \phi \qquad (1)$$

In equation (1), $\omega$ is the angular speed (to be referred to as the revolution count or frequency) of the stepping motor, and $K_E$ is a counter EMF constant and is an inherent constant of the stepping motor.

In the technique disclosed by patent document 5, a feedback loop is formed by way of having the detection value $\cos \phi$ approach close to the target value $\cos(\phi_{REF})$ thereof, thus optimizing the coil currents $I_{OUT1}$ and $I_{OUT2}$ in the high-efficiency mode.

PRIOR ART DOCUMENTS

Patent Publication

[Patent document 1] Japan Patent Publication No. JPH09103096
[Patent document 2] Japan Patent Publication No. JP2004-120957
[Patent document 3] Japan Patent Publication No. JP2000-184789
[Patent document 4] Japan Patent Publication No. JP2004-180354
[Patent document 5] Japan Patent Publication No. JP6258004

SUMMARY OF THE INVENTION

Problems to be Solved by the Invention

As disclosed in patent document 5, when feedback control for the current target value $I_{REF}$ based on the load angle is incorporated, the load angle in a stable state is stabilized at the target value; however, if there is a change in the load, the load angle φ is deviated from the target angle $φ_{REF}$.

In the motor system using the driving circuit disclosed in patent document 5, a detection value cos φ corresponding to the load angle φ is generated within the driving circuit. The load angle φ includes information useful to the design or control of the system. Nonetheless, in current situations, there is no way of knowing from the outside of the driving circuit the value of the load angle currently being used for driving the stepping motor 6.

The present invention is accomplished in view of this issue. One object of an exemplary embodiment of the present invention is to provide a driving circuit capable of outputting information useful to the design or control of a system to outside.

Technical Means for Solving the Problem

A driving circuit of a stepping motor is provided according to an implementation form of the present invention. The driving circuit includes: a counter electromotive force (EMF) detection circuit, detecting a counter EMF generated in a coil; a revolution count detection circuit, detecting the revolution count of the stepping motor; and a load angle estimating portion, calculating a load angle according to the counter EMF and the revolution count. The driving circuit is configured to be capable of outputting angle information associated with the load angle to the outside, or accessing angle information from the outside.

The load angle φ can be understood as a delay in a mechanical angle relative to an electrical angle. The load angle φ is associated with the margin before the occurrence of out-of-step or a drastic change in the load. Hence, by outputting information associated with the load angle, such information can be effectively used for determining the state of a stepping motor or optimization of control parameters. Further, the so-called "calculating a load angle" can also include, in addition to calculating the load angle φ, generating the detection value cos φ associated with the load angle φ.

The driving circuit can further include an interface circuit that outputs the angle information in form of a digital signal to the outside.

The driving circuit can further include a digital-to-analog converter (DAC) that converts the angle information to an analog signal, and a buffer circuit that outputs the analog signal to the outside.

The angle information can also be a margin before the occurrence of out-of-step. For example, the margin can be a difference between π/2 of out-of-step and the load angle φ, or can be a difference between an actual out-of-step limit set from the outside and the load angle φ.

The angle information can also be the load angle.

The driving circuit can further include: a current value setting circuit, generating a current setting value; a constant current chopper circuit, generating a pulse modulation signal that modulates by way of having a detection value of a coil current flowing through the coil approach close to a target value based on the current setting value; and a logic circuit, controlling a bridge circuit connected to the coil.

The current value setting circuit can generate the current setting value according to the counter EMF.

The current value setting circuit can further include a feedback controller, which generates the current setting value by way of having the load angle φ approach close to the target value $φ_{REF}$ thereof. The feedback controller can also generate the current setting value by way of having the detection value cos φ corresponding to the load angle φ approach close to a target value cos($φ_{REF}$) thereof.

The constant current chopper circuit can further include: a comparator, comparing the detection value of the coil current with a threshold value based on the current setting value; an oscillator, performing oscillation according to a predetermined frequency; and a flip-fop, outputting the pulse modulation signal, which transitions to an off level according to an output of the comparator and transitions to an on level according to an output of the oscillator.

The driving circuit can be integrated on a semiconductor substrate. The term "integrated" includes a situation where all constituent elements of the circuit are formed on the semiconductor substrate and a situation where main constituent elements of the circuit are formed on the semiconductor substrate; alternatively, a part of resistors or capacitors can be provided outside the semiconductor substrate so as to adjust circuit constants. By integrating the circuit in one chip, circuit area can be reduced while preserving balanced characteristics of electrical elements.

Further, any combination of the constituent elements above, and any invention derived from mutual substitutions made to the constituent elements of the invention and methods, devices and systems presented therefrom are also considered as effective embodiments of the present invention.

Effects of the Invention

According to an embodiment of the present invention, information useful to the design or control of a system can be provided to the outside.

DETAILED DESCRIPTION OF THE EMBODIMENTS

Details of the present invention are given in preferred embodiments with the accompanying drawings below. The same or equivalent constituent elements, components, or processes depicted in the drawings are represented by the same denotations, and repeated description is appropriately omitted. Further, the embodiments are examples that do not form limitations to the present invention. All features stated in the embodiments and any combination thereof are not necessarily essential features of the present invention.

In the description, "a state of component A being connected to component B" includes, in addition to a situation where component A and component B are directly physically connected, a situation where component A and component B are indirectly connected to other components, in a way that no substantial influences are produced on the electrical connection state thereof or no damage on functions and effects produced thereby in combination is resulted.

Similarly, "a state of component C being arranged between component A and component B" includes, in addition to a situation where component A and component C or component B and component C are directly connected, a situation where said components are connected to other components, in a way that no substantial influences are produced on the electrical connection state thereof or no damage on functions and effects produced thereby in combination is resulted.

For better understanding, the vertical and horizontal axes of waveform diagrams and timing diagrams referred in the description are appropriately scaled up or scaled down. Further, the waveforms depicted are simplified, exaggerated or emphasized for better understanding.

Figure 4:
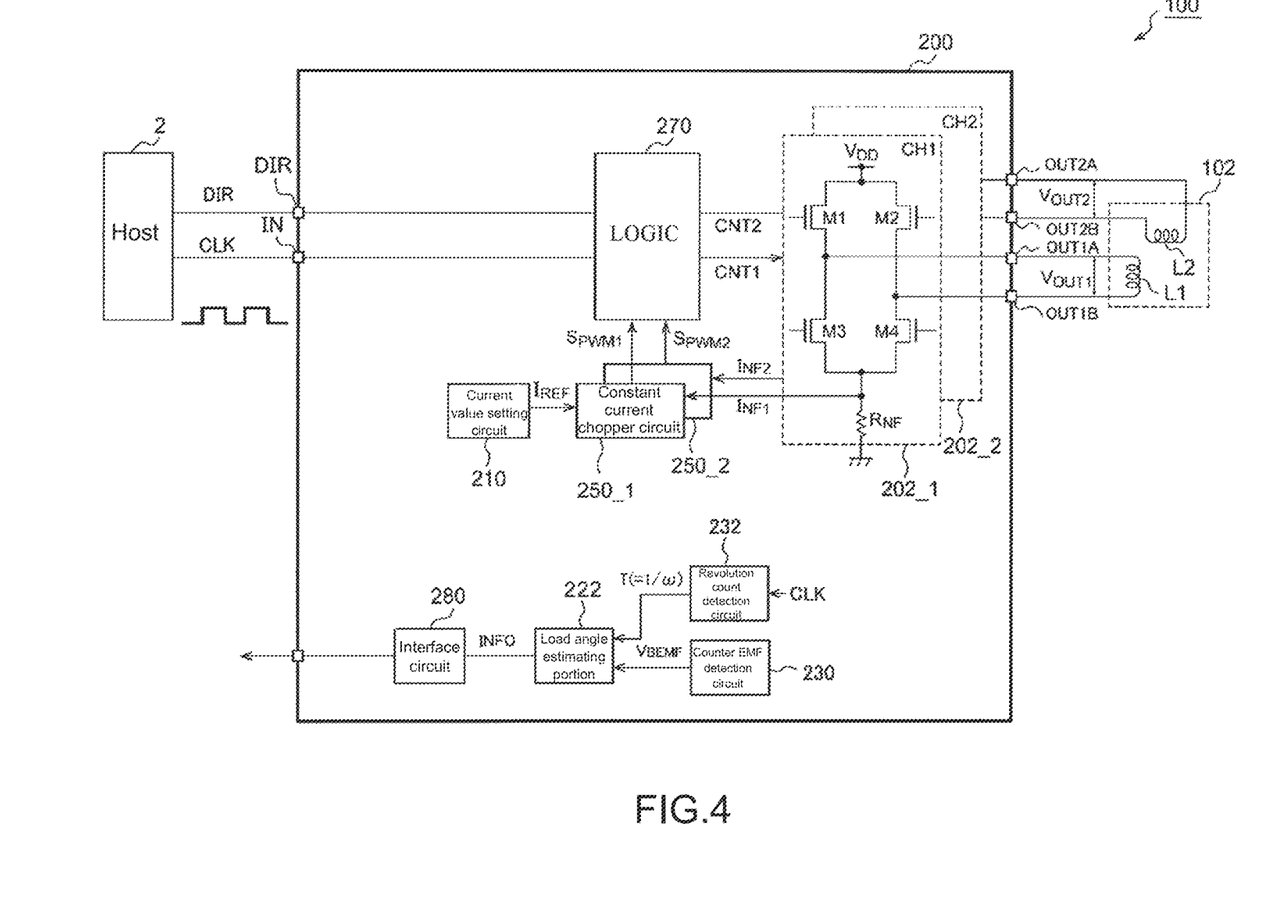
FIG. 4 is a block diagram of a motor system of a driver system according to an embodiment.

FIG. 4 shows a block diagram of a motor system 100 of a driving circuit 200 according to an embodiment. The driving circuit 200, a stepping motor 102 and a host controller 2 jointly form the motor system 100. The stepping motor 102 can be any of a permanent magnet (PM) type, a variable reluctance (VR) type, and a hybrid type.

The input clock CLK is inputted from the host controller 2 to an input pin IN of the driving circuit 200. Further, a direction indication signal DIR indicating a clockwise (CW) direction or a counterclockwise (CCW) direction is inputted to a direction indication pin DIR of the driving circuit 200.

Each time when the driving circuit 200 is inputted to the input clock CLK, a rotor of the stepping motor 102 rotates toward a direction corresponding to the direction indication signal DIR by a predetermined angle.

The driving circuit 200 includes bridge circuits 202_1 and 202_2, a current value setting circuit 210, a counter electromotive force (EMF) detection circuit 230, a revolution count detection circuit 232, a load angle estimating portion 222, constant current chopper circuits 250_1 and 250_2, a logic circuit 270 and an interface circuit 280, which are integrated on one semiconductor substrate.

In this embodiment, the stepping motor 102 is a 2-phase motor, and includes a first coil L1 and a second coil L2. The driving method of the driving circuit 200 is not specifically defined, and can be any one of 1-phase excitation, 2-phase excitation, 1-2-phase excitation, and micro-stepping motor (W1-2-phase driving or 2W1-2-phase driving).

The bridge circuit 202_1 of a first channel CH1 is connected to the first coil L1. The bridge circuit 202_2 of a second channel CH2 is connected to the second coil L2.

Each of the bridge circuits 202_1 and 202_2 is an H bridge circuit including four transistors M1 to M4. The transistors M1 to M4 of the bridge circuit 202_1 are switched according to a control signal CNT1 from the logic circuit 270, accordingly switching the voltage (also referred to as a first coil voltage) $V_{OUT1}$ of the first coil L1.

The bridge circuit 202_2 is identically structured as the bridge circuit 202_1, the transistors M1 to M4 thereof are switched according to a control signal CNT2 from the logic circuit 270, accordingly switching the voltage (also referred to as a second coil voltage) $V_{OUT2}$ of the second coil L2.

The current value setting circuit 210 generates a current setting value $I_{REF}$. Shortly after the startup of the stepping motor 102, the current setting value $I_{REF}$ is immediately fixed at a predetermined value (referred to as a maximum torque setting value) $I_{FULL}$. The predetermined value $I_{FULL}$ can also be set as a maximum value of a configurable current range of the current setting value $I_{REF}$. In this case, the stepping motor 102 is driven by using full torque—such state is referred to as a high-torque mode.

Once the stepping motor 102 starts rotating stably, in other words, once the possibility of out-of-step is reduced, the stepping motor 102 transitions to a high-efficiency mode. The current value setting circuit 210 adjusts the current setting value $I_{REF}$ by means of feedback control in the high-efficiency mode, hence reducing power consumption.

Each of the bridge circuits 202_1 and 202_2 includes a current detection resistor $R_{NF}$, and the voltage of the current detection resistor $R_{NF}$ reduces to become a detection value of the coil current IL. Further, the position of the current detection resistor $R_{NF}$ is not limited, and the current detection resistor $R_{NF}$ can be configured on a power side, or be connected to the coils in series and be configured between two outputs of the bridge circuits.

The constant current chopper circuit 250_1 generates a pulse modulation signal $S_{PWM1}$ while electricity passes through the first coil L1, wherein the PWM signal $S_{PWM1}$ modulates by way of having a detection value $I_{NF1}$ of a coil current $I_{L1}$ flowing through the first coil L1 approach close to a target value based on the current setting value $I_{REF}$. The constant current chopper circuit 250_2 generates a PWM signal $S_{PWM2}$ while electricity passes through the second coil L2, wherein the PWM signal $S_{PWM2}$ modulates by way of having a detection value $I_{NF2}$ of a coil current $I_{L2}$ flowing through the second coil L2 approach close to the current setting value $I_{REF}$.

The logic circuit 270 controls one output of the full-bridge circuit 202_1 connected to the first coil L1 according to the PWM signal $S_{PWM1}$. Further, the logic circuit 270 controls the full-bridge circuit 202_2 connected to the second coil L2 according to the PWM signal $S_{PWM2}$.

Each time when the logic circuit 270 is inputted to the input clock CLK, the excitation position is changed and the coil (or coil pair) supplying current is switched. The excitation position can be understood as a combination of the values of the respective current currents of the first coil L1 and the second coil L2 and flowing directions thereof The excitation position can transition according to a positive edge or a negative edge of the input clock CLK, or can transition according to both said edges thereof.

As described above, the current value setting circuit 210 is configured to be switched to (i) the high-torque mode, in which the current setting value $I_{REF}$ of a predetermined coil current amplitude is fixed to a larger value equivalent to full torque, and (ii) the high-efficiency mode, in which the current setting value $I_{REF}$ is adjusted by means of feedback control.

The counter EMF detection circuit 230 detects a counter EMF $V_{BEFM1}$ ($V_{BEMF2}$) generated in the coil L1 (L2) of the stepping motor 102. The method for detecting the counter EMF is not specifically limited, and can be implemented by commonly known techniques. In general, the counter EMF can be obtained by setting two ends of a coil to high impedance by setting a detection window (detection interval), and then sampling the coil voltage at this point. For example, in 1-phase excitation or 1-2-phase excitation, the counter EMF $V_{BEMF1}$ ($V_{BEMF2}$) can be measured at each excitation position (2, 4, 6 and 8 in FIG. 2) in high impedance, i.e., each predetermined excitation position, on one end (the output of the bridge circuit) of the coil serving as a monitoring object.

The revolution count detection circuit 232 obtains the revolution count ω (to be referred to as the revolution ω) of the stepping motor 102, and generates a detection signal representing the revolution ω. For example, the revolution count detection circuit 232 can measure a period T (=2π/ω) directly proportional to the reciprocal of the revolution ω, and output the period T as the detection signal. In a situation free from out-of-step, the frequency (period) of the input pulse IN is directly proportional to the revolution count (period) of the stepping motor 102. Thus, the revolution count detection circuit 232 can also set the detection signal by measuring an input pulse IN, or on the basis of the period of an internal signal generated based on the input pulse IN.

The load angle estimating portion 222 estimates a load angle ϕ according to the back-EMF $V_{BEMF1}$ and the revolution count co. The load angle ϕ is equivalent to a difference between a current vector (i.e., position instruction) determined by the driving current flowing through the first coil L1 and the position of the rotor (mover). As described above, the back-EMF $V_{BEMF1}$ is provided according to the following equation:

$V_{BEMF1} = K_E \cdot \omega \cdot \cos \phi$

In the equation above, $K_E$ is the counter EMF constant, and ω is the revolution count. Thus, by measuring the counter EMF $V_{BEMF1}$ and the revolution ω, a detection value correlated with the load angle ϕ can be generated. For example, cos ϕ can be set as the detection value. In this case, the detection value is represented by equation (2):

$$\cos\phi = V_{BEMF1} \cdot \frac{\omega^{-1}}{K_E} \quad (2)$$
$$= V_{BEMF1} \cdot \left(\frac{T}{2\pi}\right) \cdot K_E^{-1}$$

The driving circuit 200 is configured to be capable of outputting angle information INFO associated with the load angle ϕ acquired in the load angle estimating portion 222 to the outside, or is configured to be capable of accessing the angle information INFO from the outside. Thus, the driving circuit 200 is provided with the interface circuit 280. The angle information INFO can be supplied to the host controller, or be supplied to other circuits.

The angle information is specifically limited, and any one of the following can be used.

(1) cos ϕ can be used as the angle information INFO. In this case, calculation can be performed by using equation (2).

(2) ϕ can be used as the angle information INFO. In this case, calculation can be performed by using equation (3). ϕ can be in a unit of degrees (°) or radian.

$\phi = \arccos(V_{BEMF} \cdot (T/2\pi) \cdot K_E^{-1})$ (3)

(3) The margin can also be used as the angle information INFO. The margin is a difference $\phi_{LIM-\phi}$ between an out-of-step limit $\phi_{LIM}$ and the load angle ϕ. An ideal value π/2 (90°) can be used as the out-of-step limit $\phi_{LIM}$. Alternatively, an actual value set from the outside through such as a register can be used as the out-of-step limit $\phi_{LIM}$.

(4) In the following situation where the current setting value $I_{REF}$ is adjusted by using feedback control of the load angle ϕ, the error ERR of the load angle ϕ and the target value $\phi_{REF}$ can be set as the angle information INFO.

The angle information is not limited to being the above, and a value associated with the load angle ϕ can be used.

Alternatively, the interface circuit 280 can also be set as being capable of switching between enabled and disabled; in a situation where the angle information needs to be known, the interface circuit 280 is set as enabled.

Figure 5A:
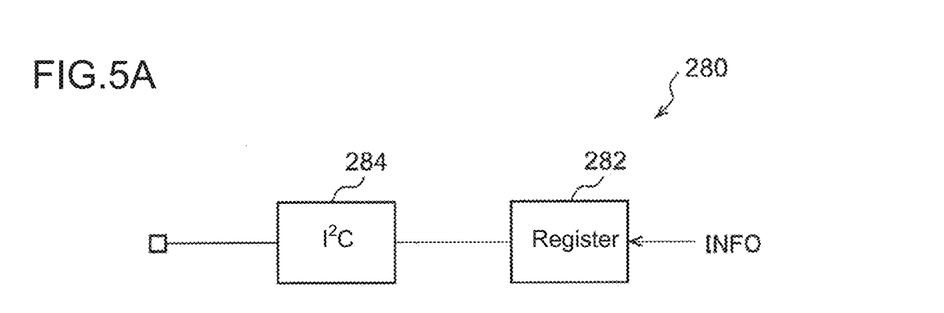
FIG. 5A to FIG. 5C are diagrams of exemplary structures of an interface circuit.

FIG. 5A to FIG. 5C show diagrams of exemplary structures of the interface circuit 280. The interface circuit 280 in FIG. 5A includes a register 282, and an inter-integrated circuit (I2C) circuit 284. Angle information of a specific time point is written to the register 282. Alternatively, the value in the register 282 can also be constantly updated according to the angle information changing with time. The I2C circuit 284 can output the angle information to the outside upon receiving accessing of the register 282 from the outside. Alternatively, a serial peripheral interface (SPI) or other transmitters or receivers can also be used in substitution for I2C.

Figure 5B:
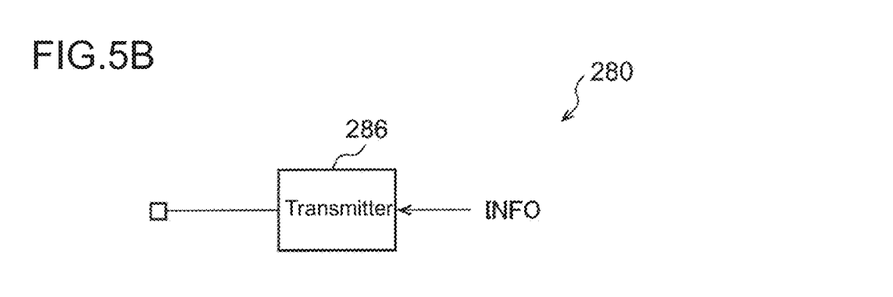

Alternatively, the interface circuit 280 can also output the angle information to the outside, regardless of whether there is a request from the outside. In FIG. 5B, digital angle information is always outputted to the outside by a transmitter 285.

Figure 5C:
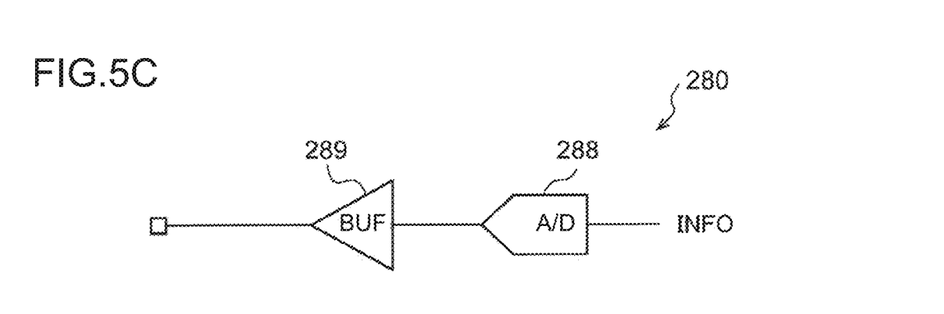

In FIG. 5C, digital angle information is converted to an analog signal (a voltage signal) by a digital-to-analog converter (DAC) 288, and then a buffer 289 outputs the analog signal to the outside.

Figure 6:
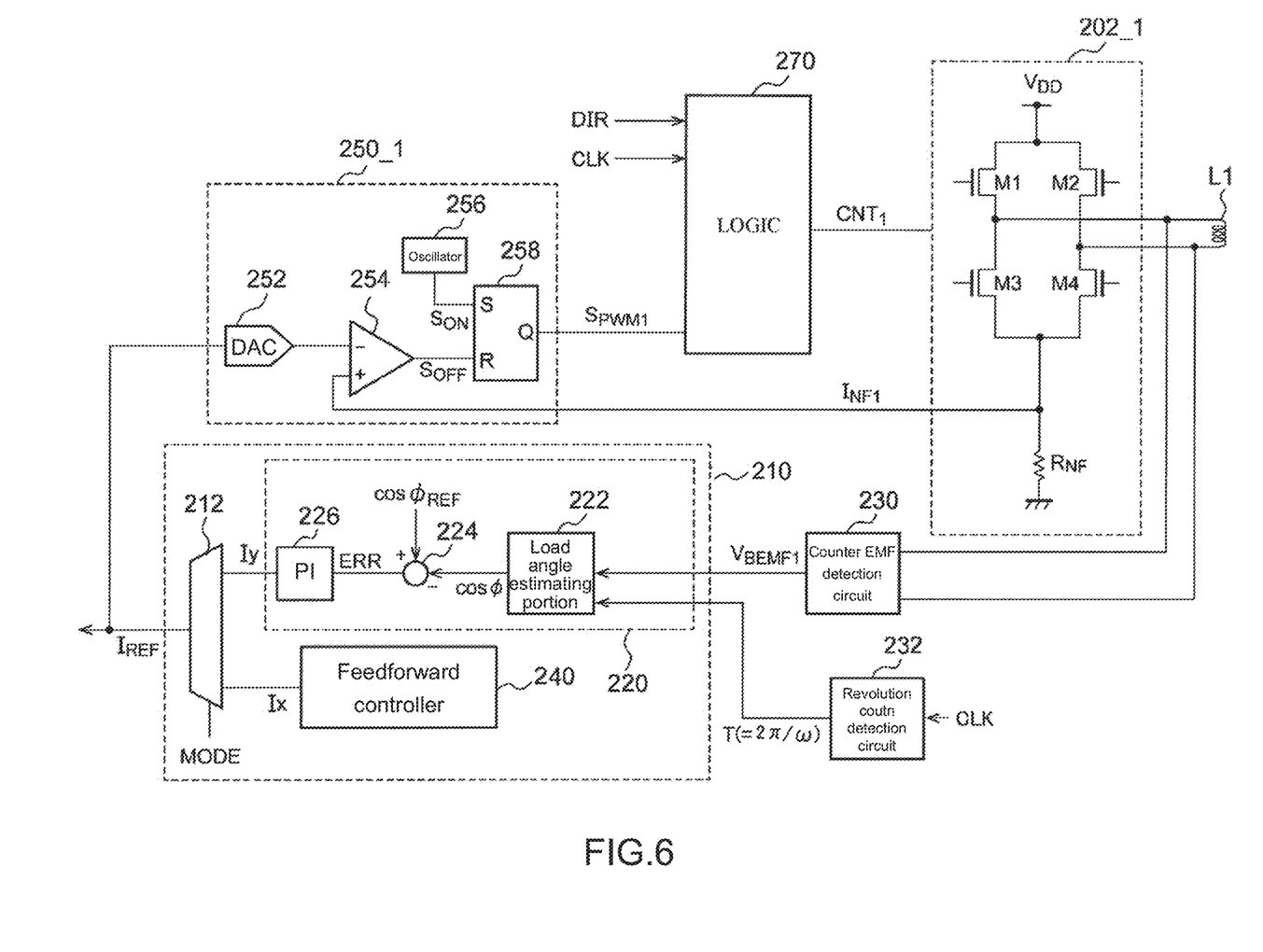
FIG. 6 is a circuit diagram of an exemplary structure of a driving circuit.

FIG. 6 shows a circuit diagram of an exemplary structure of the driving circuit 200. In FIG. 6, only parts related to the first coil 11 are depicted.

The current value setting circuit 210 is described below. The current value setting circuit 210 includes a feedback controller 220, a feedforward controller 240, and a multiplexer 212. The feedforward 240 outputs a fixed current setting value Ix (=$I_{FULL}$) used in the high-torque mode shortly after the startup. The current setting value Ix is set to a larger value in order to avoid out-of-step.

The feedforward controller 220 is activated in the high-efficiency mode, and outputs a current setting value Iy based on feedback controlled by the counter EMF $V_{BEMF}$.

The multiplexer 216 selects one of the two signals Ix and Iy according to a determination signal MODE, and outputs the selected signal as a current setting value $I_{ref}$.

In FIG. 6, the load angle estimating portion 222 is incorporated into the feedback controller 220. The feedback controller 220 further includes a subtractor 224 and a proportional integration (PI) controller 226 in addition to the load angle estimating portion 222.

The feedback controller 220 generates the current setting value Iy by way of having the estimated load angle ϕ approach close to the predetermined target angle $\phi_{REF}$. More specifically, the subtractor 224 generates an error ERR of the detection value cos ϕ corresponding to the load angle ϕ and the target value cos($\phi_{REF}$) thereof. The PI controller 226 performs a PI control operation by way for having the error ERR become zero and generates the current setting value Iy. Alternatively, the processing of the feedback controller 220 can also be realized in an analog circuit using an error amplifier.

The constant current chopper circuit 250_1 includes a DAC 252, a PWM comparator 254, an oscillator 256, and a flip-flop 258. The DAC 252 converts the current setting value $I_{REF}$ to an analog voltage $V_{REF}$. The PWM comparator 254 compares the feedback signal $I_{NF1}$ with the reference voltage $V_{REF}$, and asserts a turn-off signal $S_{OFF}$ (setting to high) if $I_{NF1}$ is more than $V_{REF}$. The oscillator 256 generates a periodic turn-on signal $S_{ON}$ specifying the chopper frequency. The flip-flop 258 outputs the PWM signal $S_{PWM1}$, which changes to an on level (e.g., high) according to the turn-on signal $S_{ON}$ or changes to an off level (e.g., low) according to the turn-off signal $S_{OFF}$.

The interface circuit 280 is omitted from FIG. 6. The interface circuit 280 is capable of generating the angle information INFO according to the detection value cos φ generated by the load angle estimating portion 222.

The structure of the driving circuit 200 is described as above, and the operation of the driving circuit 200 is to be described below.

(i) The interface circuit 280 can be effective utilized in a design phase of the motor system 100. For example, in the design phase, while angle information (the load angle φ) is being monitored, control parameters (e.g., the current value $I_{FULL}$ in the high-torque mode, the current value $I_{LOW}$ in the high-efficiency mode to be described below, or the frequency waveform of the input clock CLK) of the motor can be optimized.

(ii) The interface circuit 280 can also be effectively utilized during the actual operation of the motor system 100. For example, in the high-torque mode or the high-efficiency mode, the change in the load of the motor or the risk of out-of-step can be determined by monitoring the angle information. Further, while monitoring angle information, the angle information is determined as erroneous if it deviates from an accuracy range.

Figure 7:
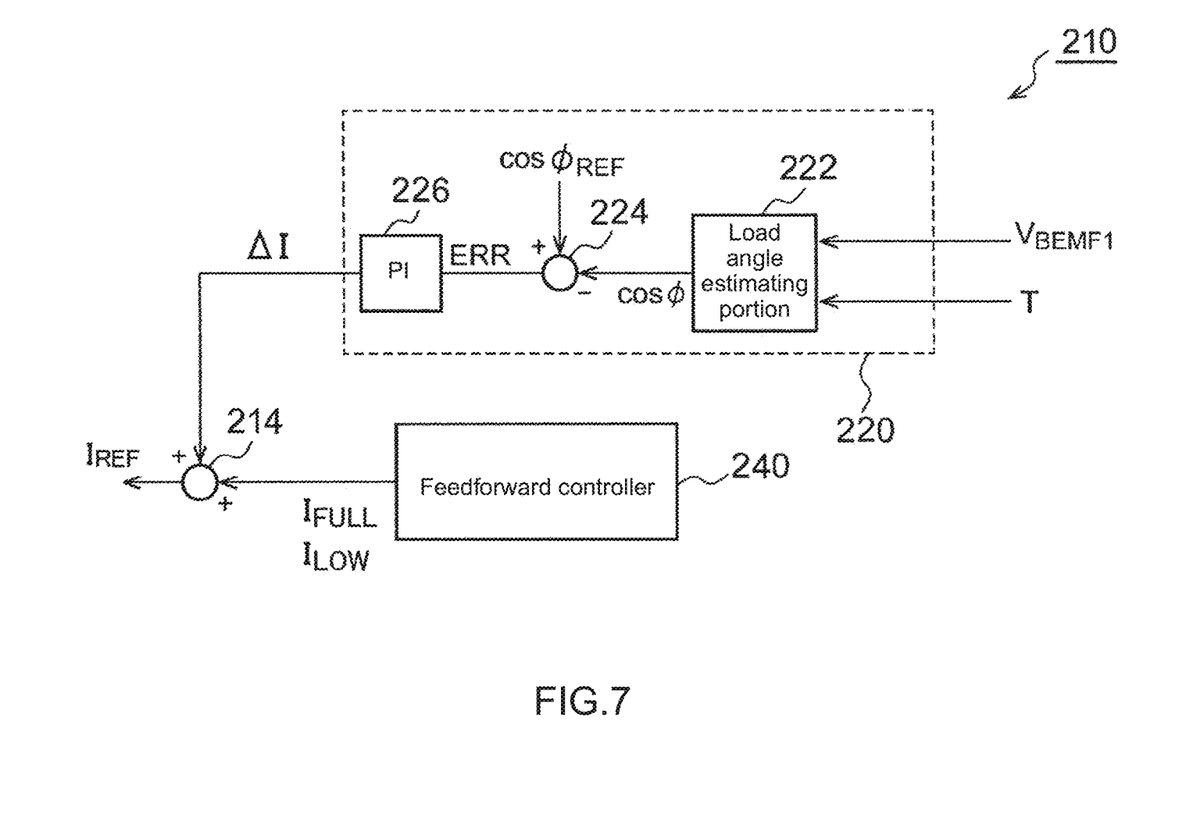
FIG. 7 is a diagram of another exemplary structure of a current value setting circuit.

FIG. 7 shows a diagram of another exemplary structure of the current value setting circuit 210. The feedback controller 220 is activated in the high-efficiency mode, and generates a current correction value ΔI. The value of the current correction value ΔI is adjusted by way of having the load angle φ approach close to the target value $φ_{REF}$. The current correction value ΔI is zero in the high-torque mode.

In the high-efficiency mode, the feedforward controller 240 outputs the predetermined high-efficiency setting value $I_{LOW}$. The relationship $I_{FULL} > I_{LOW}$ can also be established. The current value setting circuit 210 includes an adder 214 in substitution for the multiplexer 212 in FIG. 5A to FIG. 5C. The adder 214 adds the high-efficiency setting value $I_{LOW}$ generated by the feedforward controller 240 with the current correction value ΔI. Thus, the current setting value $I_{REF}$ is adjusted as $I_{REF} = I_{LOW} + ΔI$ by way of having the load angle φ approach close to the target value $φ_{REF}$.

Figure 8:
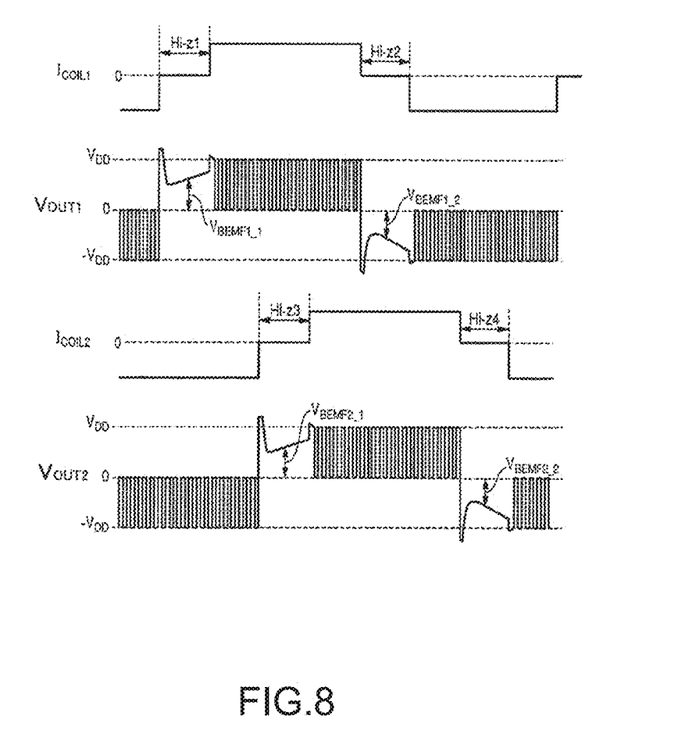
FIG. 8 is a waveform diagram of voltage and current of a stepping motor.

The detection for the counter EMF $V_{BEMF}$ by the counter EMF detection circuit 230 is described below. FIG. 8 shows a waveform diagram of voltage and current of the stepping motor 102. In FIG. 8, a coil current $I_{COIL1}$, a voltage $V_{OUT1}$ between two ends of the first coil L1, a coil current $I_{COIL2}$, and a voltage $V_{OUT2}$ between two ends of the second coil L2 are sequentially depicted from the top. Hi-z1 and Hi-z2 represent high-impedance states of outputs OUT1A and OUT1B of the bridge circuit 202_1. Hi-z3 and Hi-z4 represent high-impedance states of outputs OUT2A and OUT2B of the bridge circuit 202_2. The counter EMF $V_{BEMF}$ is detected in a high-impedance period (to be referred to as a turned-off period).

Figure 9A:
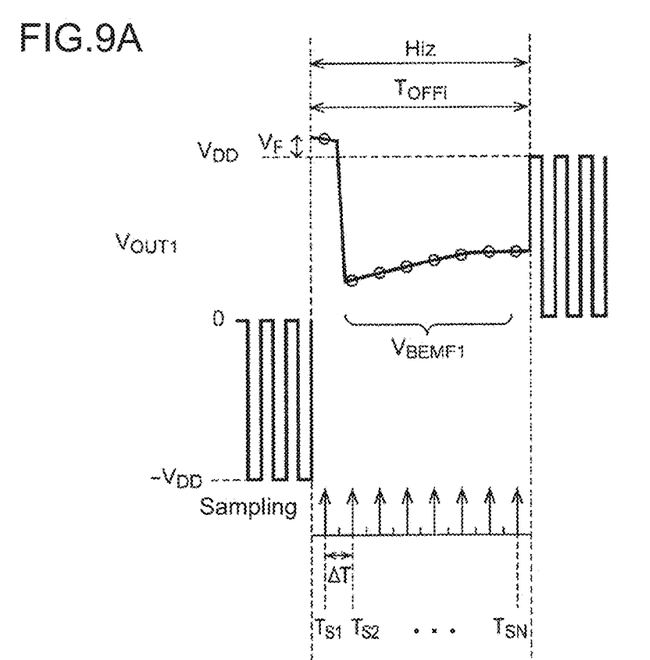
FIG. 9A and FIG. 9B are diagrams of measuring a counter electromotive force (EMF)
Figure 9B:
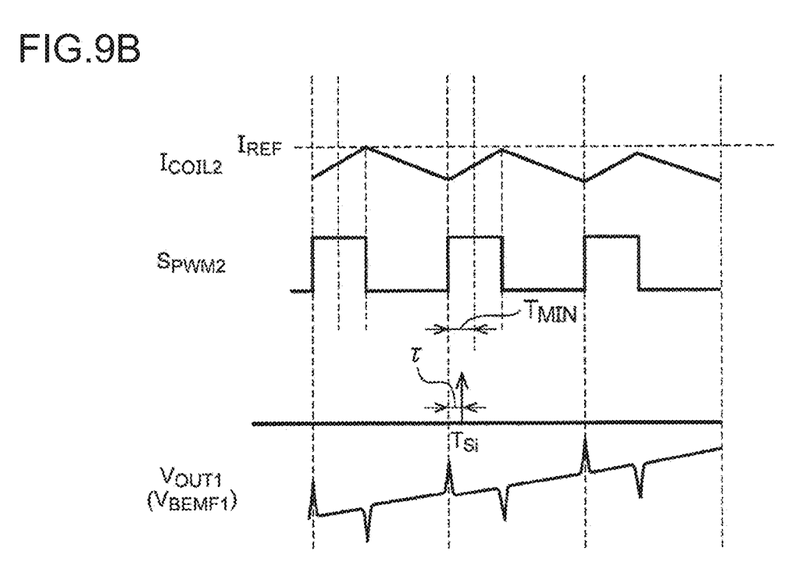

FIG. 9A and FIG. 9B show diagrams of measuring the counter EMF. The counter EMF detection circuit 230 measures the duration of the turned-off period $T_{OFF}$ for each cycle. Next, The turned-off period $T_{OFF(i-1)}$ measured in the previous turned-off period (i−1) is segmented into N parts (e.g., N is 8, 16 or 32) to generate a sampling interval ΔT of the current cycle i.

$$ΔT_i = T_{OFF(i-1)}/N$$

Next, sampling time points $T_{s1}$ to $T_{sN}$ are configured for each ΔTi, and the voltage $V_{OUT1}$ between the two ends of the coil L1 is sampled. As shown in FIG. 9A and FIG. 9B, after transition to the turned-off period $T_{OFFi}$, the coil current $I_{COIL1}$ (regenerative current) immediately flows, and thus the voltage $V_{OUT1}$ jumps to $V_{DD} + V_F$. If the coil current $I_{COIL1}$ becomes zero, counter EMF $V_{BEMF1}$ occurs.

The counter EMF detection circuit 230 discards first several (e.g., the $1^{st}$ to $3^{rd}$) samples and last several samples (e.g., the $8^{th}$) from the N (e.g., 8) samples, and calculates an average value of the remaining samples (referred to as effective samples, e.g., 4 to 7 samples). Thus, influences of noise can be reduced to acquire a more accurate counter EMF $V_{BEMF}$.

FIG. 9B shows a diagram of a sampling time point $T_{si}$ of the counter EMF. During a turned-off period of the bridge circuit 202_1, the other bridge circuit 202_2 is PWM controlled by the constant current chopper circuit 250_2. Because the counter EMF $V_{BEMF1}$ includes noise generated from switching of the bridge circuit 202_2, the sampling time point $T_{si}$ (where i=1 to N) of the counter EMF $V_{BEMFi}$ is preferably avoided from a transition time point of the bridge circuit 202_2.

The PWM signals $S_{PWM1}$ and $S_{PWM2}$ generated by the constant current chopper circuits 250_1 and 250_2 are set with a minimum turn-on time $T_{MIN}$. Next, by setting the sampling time point $T_{si}$ as a predetermined time τ ($< T_{MIN}$) along a positive edge of the PWM signal, it can be ensured that the sampling time point $T_{si}$ does not coincide with the negative edge of the PWM signal, thereby mitigating influences of noise.

Figure 10:
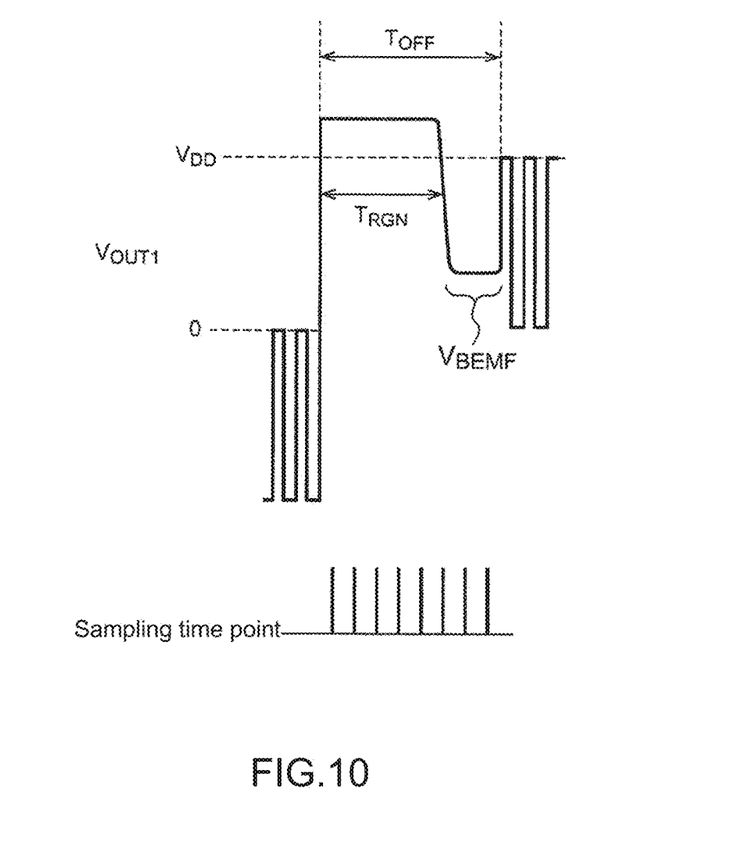
FIG. 10 is a waveform diagram of a coil voltage with respect to a large number of revolution.

The turned-off period $T_{OFF}$ reduces as the stepping motor 102 gets faster. FIG. 10 shows a waveform diagram of the coil voltage $V_{OUT1}$ with respect to a larger number of revolution. As described above, the regenerative current flows during a regeneration period $T_{RGN}$ subsequent to the turned-off period $T_{OFF}$, and the coil voltage $V_{OUT1}$ is fixed at a higher value ($V_{DD} + V_F$). If the revolution count increases, the turned-off period $T_{OFF}$ reduces, and the duration of the regeneration period $T_{RNG}$ is substantially fixed on the other hand. As a result, the number of sampling time points included within the regeneration period increases. In other words, the effective sample is fixed at a high level. Therefore, in a situation where one or more among multiple effective samples include high ($V_{DD} + V_F$), the counter EMF detection is made void.

Figure 11A:
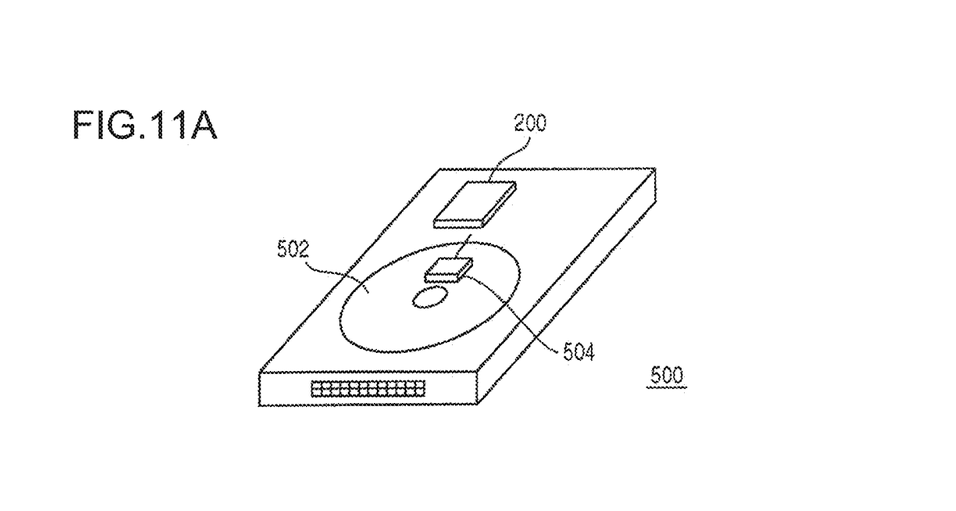
FIGS. 11A to 11C are three-dimensional diagrams of examples of an electronic machine having a driving circuit.
Figure 11B:
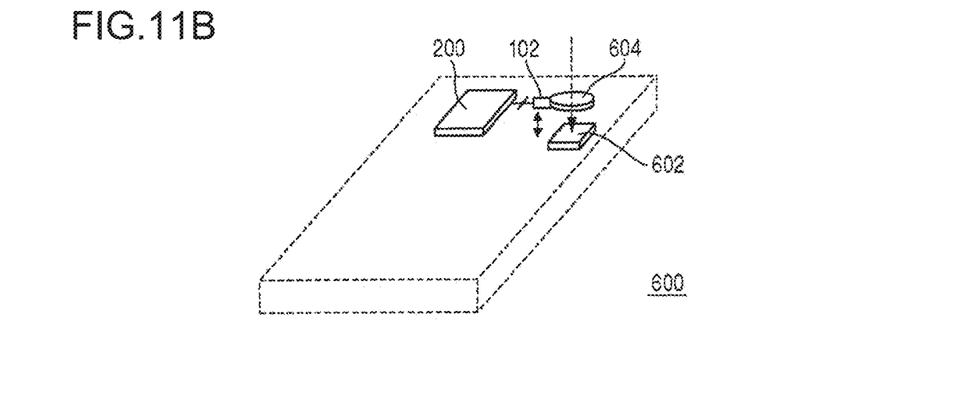
Figure 11C:
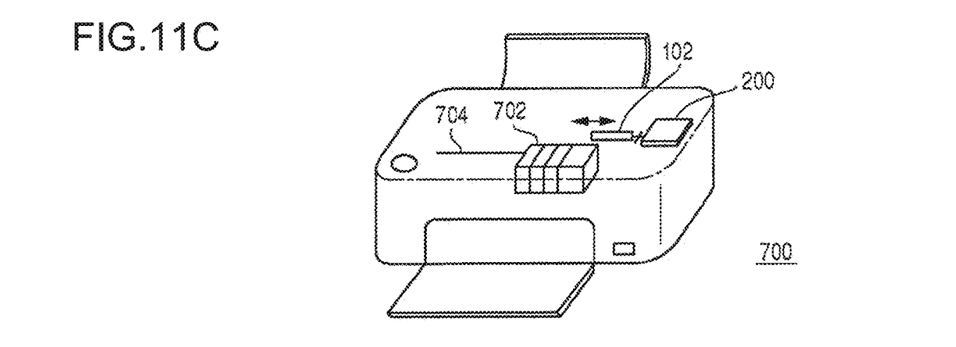

Lastly, the purpose of the driving circuit 200 is described below. The driving circuit 200 is used in various electronic machines. FIGS. 11A to 11C show three-dimensional diagrams of examples of electronic machines including the driving circuit 200.

The electronic machine in FIG. 11A is an optical disc device 500. The optical disc device 500 includes an optical disc 502 and a reader 504. The reader 504 is provided to write data to and read data from the optical disc 502. The reader 504 is capable of moving (tracking) on a recording surface of the optical disc 502 along a radial direction of the optical disc 502. Further, the distance from the reader 504 to the optical disc is also variable (for focusing). The reader 504 is positioned by a stepping motor not shown in the drawing. The driving circuit 200 controls the stepping motor. This structure is capable of avoiding out-of-step on one hand and efficiently positioning the reader 504 with high precision on the other hand.

The electronic machine in FIG. 11B is a device 600 such as a digital static camera, a digital video camera or a cell phone terminal having an image capturing function. The device 600 includes a capturing element 602 and an automatic focusing lens 604. The stepping motor 102 performs positioning of the automatic focusing lens 604. This structure of the driving circuit 200 for driving the stepping motor 102 is capable of avoiding out-of-step on one hand and efficiently positioning the automatic focusing lens 604 with high precision on the other hand. In addition to an automatic focusing lens, the driving circuit 200 can also be used to drive a jitter correction lens. Alternatively, the driving circuit 200 can also be used in aperture control.

The electronic machine in FIG. 11C is a printer 700. The printer 700 includes a head 702 and a guiding rail 704. The head 702 is supported and can be positioned along the guiding rail 704. The stepping motor 102 controls the position of the head 702. The driving circuit 200 controls the stepping motor 102. This structure is capable of avoiding out-of-step on one hand and efficiently positioning the head 702 with high precision on the other hand. In addition to being used for driving the head, the driving circuit 200 can also be used to drive a motor for a paper conveyor mechanism.

In addition to the consumer apparatuses shown in FIGS. 11A to 11C, the driving circuit 200 can be preferably used in industrial apparatuses or robots.

The present invention is described by way of the embodiments above. The embodiments are examples, and a person skilled in the art should understand that there are numerous variation embodiments from combinations of these constituent elements and processes. Further, such variation embodiments are to be encompassed within the scope of the present invention. Some variation embodiments are described below.

Variation Embodiment 1

The logic circuit 270 can also adjust the power voltage $V_{DD}$ supplied to the bridge circuit 202 by way of having the load angle $\phi$ approach close to the target angle $\phi_{REF}$ in substitution for adjusting the power voltage $V_{DD}$ supplied to the bridge circuit 202 by way of adjusting the duty cycle of the PMW signal S2 or in combination with adjusting the duty cycle of the PMW signal S2. By changing the power voltage $V_{DD}$, the power in the coils L1 and L2 of the stepping motor 102 can be changed.

Variation Embodiment 2

In the embodiments above, a situation where the bridge circuit 202 is formed by a full-bridge circuit (H bridge) is given as an example; however, the present invention is not limited thereto, and a half-bridge circuit can be used. Further, the bridge circuit 202 and a driving circuit 200 (200B) can be different chips, or can be discrete parts.

Variation Embodiment 3

The method for generating the current setting value Iy in the high-efficiency mode is not limited to the methods described in the embodiments. For example, the target value $V_{BEMF}$ (REF) of the counter EMF $V_{BEMF1}$ can be determined in advance, and a feedback loop can be formed by way of having the counter EMF $V_{BEMF1}$ approach close to the target value $V_{BEMF}$ (REF).

Variation Embodiment 4

In the embodiments above, the two currents $I_{OUT1}$ and $I_{OUT2}$ flowing through the two coils are connected or disconnected according to the excitation position, and the current amounts thereof are fixed regardless of how the excitation position changes. In this case, the torque changes in 1-2-phase excitation. In substitution for the control, the currents $I_{OUT1}$ and $I_{OUT2}$ can also be corrected by a fixed torque regardless of how the excitation position changes. For example, in 1-2-phase excitation, the values of the currents $I_{OUT1}$ and $I_{OUT2}$ at the excitation positions 2, 4, 6 and 8 can be set as $\sqrt{2}$ times the values of the currents at the excitation positions 1, 3, 5 and 7.

Variation Embodiment 5

In the embodiments, the feedback controller 220 is formed by a PI controller but is not limited thereto. Alternatively, a proportional integral derivative (PID) controller can be used.

The present invention has been described in terms of the embodiments above. However, these embodiments demonstrate merely principles and applications of the present invention. There are numerous variations embodiments and configuration modifications without departing from the scope of the concept of the present invention, as specified in the appended claims.

What is claimed is:

1. A driving circuit that is a driving circuit of a stepping motor, comprising:
    a counter electromotive force (EMF) detection circuit, adapted to detect a counter EMF generated in a coil;
    a revolution count detection circuit, adapted to acquire a revolution count of the stepping motor;
    a load angle estimating portion, adapted to calculate a load angle according to the counter EMF and the revolution count;
    a current value setting circuit, adapted to generate a current setting value according to the load angle, a load angle target value and a fixed current setting value;
    a bridge circuit connected to the coil, wherein the current setting value is adapted to generate a control signal for controlling the bridge circuit; and
    an interface circuit, adapted to:
        output an angle information associated with the load angle to a host controller external to the driving circuit for monitoring whether an out-of-step event occurs in the stepping motor, or
        access the angle information, associated with the load angle, from another circuit external to the driving circuit for monitoring the stepping motor.

2. The driving circuit according to claim 1, wherein the angle information is a digital signal.

3. The driving circuit according to claim 1, wherein the interface circuit comprises:
    a digital-to-analog converter (DAC), adapted to convert the angle information to an analog signal; and
    a buffer circuit, adapted to output the analog signal.

4. The driving circuit according to claim 1, wherein the angle information is a margin before out-of-step.

5. The driving circuit according to claim 1, wherein the angle information is the load angle.

6. The driving circuit according to claim 1, further comprising:
    a constant current chopper circuit, adapted to generate a pulse modulation signal that pulse modulates by having a detection value of a coil current flowing through the coil approach to a target value of the current setting value; and a logic circuit, adapted to control a bridge circuit connected to the coil according to the pulse modulation signal.

7. The driving circuit according to claim 6, wherein the constant current chopper circuit comprises:
a comparator, adapted to compare the detection value of the coil current with a threshold value based on the current setting value;
an oscillator, adapted to perform oscillation according to a predetermined frequency; and
a flip-flop, adapted to output the pulse modulation signal that transitions to an off level according to an output of the comparator and transitions to an on level according to an output of the oscillator.

8. The driving circuit according to claim 1, wherein the current value setting circuit is adapted to generate the current setting value according to the counter EMF.

9. The driving circuit according to claim 1, wherein the current value setting circuit comprises:
a feedback controller, adapted to generate the current setting value by having the load angle approach to the load angle target value.

10. The driving circuit according to claim 1, wherein the driving circuit is integrated on a semiconductor substrate.

11. An electronic machine comprising:
a stepping motor; and
the driving circuit according to claim 1 for driving the stepping motor.

12. The driving circuit according to claim 1, wherein the fixed current setting value is set as two different values for a high-torque mode and a high-efficiency mode, respectively.

13. A driving method, that is a driving method of a stepping motor, comprising:
generating a current setting value;
generating a pulse modulation signal that pulse modulates by having a detection value of a coil current flowing through a coil approach to a target value based on the current setting value;
controlling a bridge circuit connected to the coil according to the pulse modulation signal;
detecting a counter electromotive force (EMF) generated in the coil;
acquiring a revolution count of the stepping motor;
calculating a load angle according to the counter EMF and the revolution count; and
supplying an angle information associated with the load angle to a host controller for monitoring whether an out-of-step event occurs in the stepping motor, or accessing the angle information, associated with the load angle, from another circuit for monitoring the stepping motor,
wherein the generating of the current setting value comprises generating the current setting value according to the load angle, a load angle target value and a fixed current setting value.

* * * * *